United States Patent [19]
McMillan et al.

[11] Patent Number: 6,064,970
[45] Date of Patent: *May 16, 2000

[54] MOTOR VEHICLE MONITORING SYSTEM FOR DETERMINING A COST OF INSURANCE

[75] Inventors: Robert John McMillan, Tampa, Fla.; Alexander Dean Craig, Moreland Hills, Ohio; John Patrick Heinen, Tampa, Fla.

[73] Assignee: Progressive Casualty Insurance Company, Mayfield Village, Ohio

[*] Notice: This patent is subject to a terminal disclaimer.

[21] Appl. No.: 09/135,034

[22] Filed: Aug. 17, 1998

Related U.S. Application Data

[63] Continuation of application No. 08/592,958, Jan. 29, 1996, Pat. No. 5,797,134.

[51] Int. Cl.⁷ .................................................. G06F 17/60
[52] U.S. Cl. ...................... 705/4; 340/439; 340/870.01; 360/5; 702/1; 705/400
[58] Field of Search .............................. 340/439, 870.01; 360/5; 701/1.7; 702/1; 705/4, 400

[56] References Cited

U.S. PATENT DOCUMENTS

| | | | |
|---|---|---|---|
| 3,504,337 | 3/1970 | Ekman | 340/439 |
| 4,067,061 | 1/1978 | Juhasz | 360/5 |
| 4,234,926 | 11/1980 | Wallace et al. | 702/188 |
| 4,258,421 | 3/1981 | Juhasz et al. | 701/35 |
| 4,533,962 | 8/1985 | Decker et al. | 360/5 |
| 4,608,638 | 8/1986 | Tsikos | 364/424 |
| 4,638,295 | 1/1987 | Middlebrook et al. | 340/465 |
| 4,667,336 | 5/1987 | Best | 377/15 |
| 4,745,564 | 5/1988 | Tennes et al. | 702/141 |
| 4,763,745 | 8/1988 | Eto et al. | 180/143 |
| 4,807,179 | 2/1989 | Clere et al. | 360/5 X |
| 4,829,434 | 5/1989 | Karmel et al. | 72/866 X |
| 4,843,463 | 6/1989 | Michetti | 358/108 |
| 4,843,578 | 6/1989 | Wade | 364/565 |
| 4,853,720 | 8/1989 | Onari et al. | 364/431.07 |

(List continued on next page.)

FOREIGN PATENT DOCUMENTS 9002388  8/1989  WIPO.

OTHER PUBLICATIONS

"The Safest Cars of 91", Baig, Edward U.S. News & World Report v109, n22, p.71;Dec. 3, 1990.

"Vendor's Spice Up Services", Robert Deierlein, Beverage-World, v109, n1467, p.82; Jun. 1990.

Rosenberg, Martin; Alexander, Shephen A. , Rate Classification Reform in New Jersey. Best's Review (Prop/Casualty) vo. 92. No. 12, pp. 30–32, Apr. 1992.

Kaneko, Tetsuya; Jovanis, Paul P. Multiday driving patterns and motor carrier accident risk. A disaggregate analysis. Accident Analysis and Prevention, vol. 24, No. 5, pp. 437–456, Jan. 1, 1992.

*Primary Examiner*—Edward R. Cosimano
*Attorney, Agent, or Firm*—Fay, Sharpe, Fagan Minnich & McKee, LLP

[57] ABSTRACT

A method and system of determining a cost of automobile insurance based upon monitoring, recording and communicating data representative of operator and vehicle driving characteristics. The cost is adjustable retrospectively and can be prospectively set by relating the driving characteristics to predetermined safety standards. The method comprises steps of monitoring a plurality of raw data elements representative of an operating state of the vehicle or an action of the operator. Selected ones of the raw data elements are recorded when the ones are determined to have an identified relationship to safety standards. The selected ones are consolidated for processing against an insurer profile and for identifying a surcharge or discount to be applied to a base cost of automobile insurance. A final cost is produced from the base costs and the surcharges or discounts.

15 Claims, 6 Drawing Sheets

U.S. PATENT DOCUMENTS

| | | | |
|---|---|---|---|
| 4,939,652 | 7/1990 | Steiner | 364/424.04 |
| 4,987,541 | 1/1991 | Levente et al. | 364/424.04 |
| 4,992,943 | 2/1991 | McCracken | 364/424.04 |
| 5,055,851 | 10/1991 | Sheffer | 342/457 |
| 5,111,289 | 5/1992 | Lucas et al. | 358/108 |
| 5,189,621 | 2/1993 | Onari et al. | 364/431.04 |
| 5,223,844 | 6/1993 | Mansell et al. | 342/357 |
| 5,319,374 | 6/1994 | Desai et al. | 342/387 |
| 5,365,451 | 11/1994 | Wang et al. | 364/449 |
| 5,430,432 | 7/1995 | Camhi et al. | 340/438 |
| 5,499,182 | 3/1996 | Ousborne | 701/35 |
| 5,500,806 | 3/1996 | Bellin et al. | 364/528.33 |
| 5,548,273 | 8/1996 | Nicol et al. | 340/439 |
| 5,550,551 | 8/1996 | Alesiu | 342/457 |
| 5,638,273 | 6/1997 | Coiner et al. | 364/424.04 |
| 5,694,322 | 12/1997 | Westerlage et al. | 705/417 |
| 5,797,134 | 8/1998 | McMillan et al. | 705/400 |

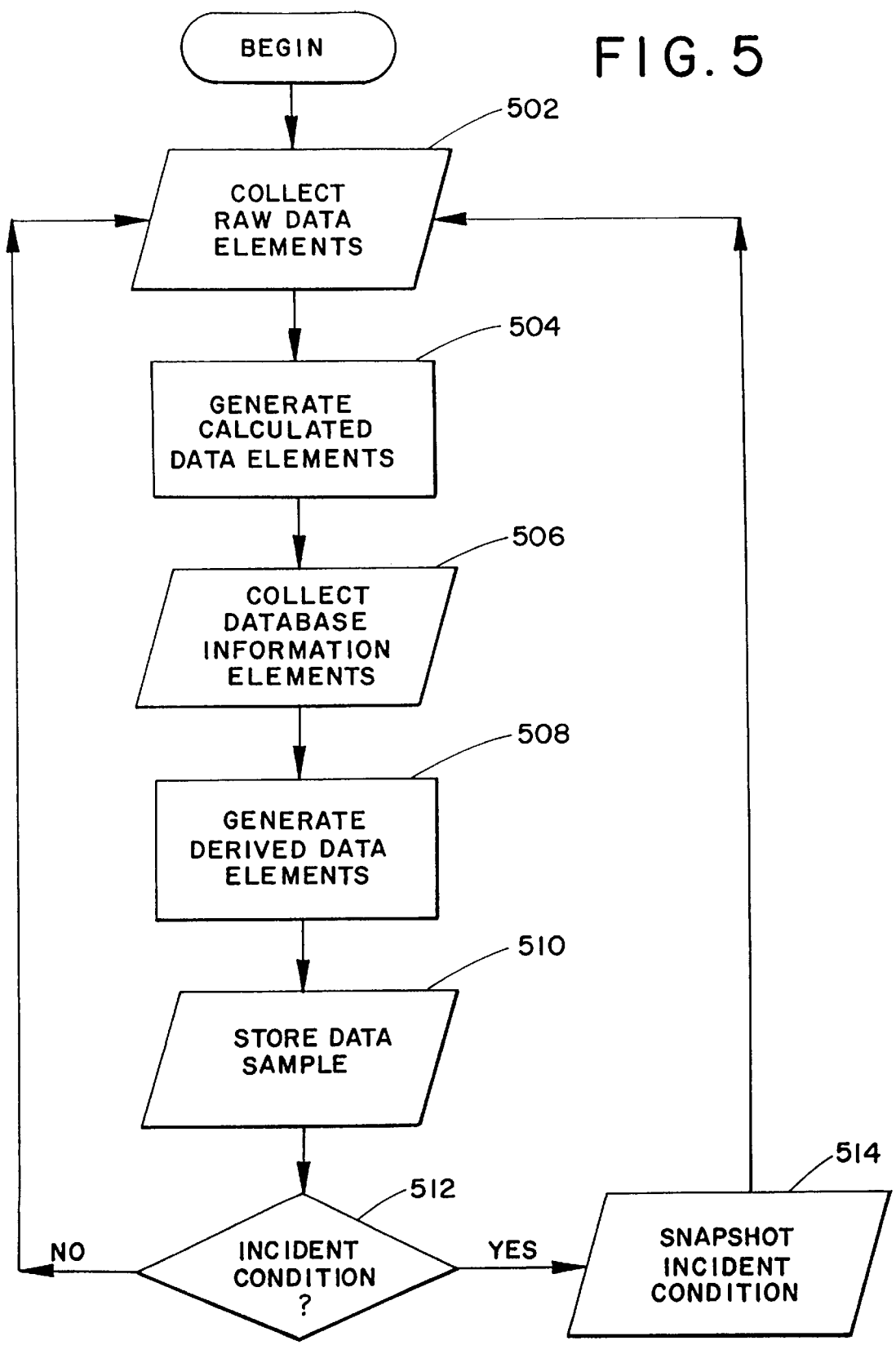

| INFORMATION DATABASE | INTERFACE | SAMPLE RATE |
|---|---|---|
| - MAPS<br>- SPEED LIMITS<br>- TRAFFIC SIGNS<br>- HIGHWAY CONDITIONS<br>- (FUTURE TBD) | - COMPUTER STORAGE | - ON DEMAND |
| VEHICLE SOURCES | INTERFACE | SAMPLE RATE |
| - ENGINE DATA<br>- BODY DATA<br>- ELECTRICAL DATA | - SAE J1978 CONNECTOR | - 10 - 15 HZ |
| OTHER SOURCES | INTERFACE | SAMPLE RATE |
| - IVHS DATA<br>- GPS DATA<br>- SECURITY SYSTEM<br>- ADDITIONAL SYSTEM(S) | - VARIOUS I/O PORTS<br>(eg, RS-232/422, ETC.) | - VARIES |

MOTOR VEHICLE INSURANCE PROCESS
VEHICLE DATA ACQUISITION PROCESS FLOW

MOTOR VEHICLE MONITORING SYSTEM FOR DETERMINING A COST OF INSURANCE

This application is a continuation application of U.S. Ser. No. 08/592,958, filed Jan. 29, 1996, now U.S. Pat. No. 5,797,134.

BACKGROUND OF THE INVENTION

The present invention relates to data acquisition and processing systems, and particularly to a system for monitoring motor vehicle operational characteristics and driver behavior to obtain increased amounts of data relating to the safety of use for purposes of providing a more accurate determination of a cost of insurance for the vehicle.

Conventional methods for determining costs of motor vehicle insurance involve gathering relevant historical data from a personal interview with the applicant for the insurance and by referencing the applicant's public motor vehicle driving record that is maintained by a governmental agency, such as a Bureau of Motor Vehicles. Such data results in a classification of the applicant to a broad actuarial class for which insurance rates are assigned based upon the empirical experience of the insurer. Many factors are relevant to such classification in a particular actuarial class, such as age, sex, marital status, location of residence and driving record.

The current system of insurance creates groupings of vehicles and drivers (actuarial classes) based on the following types of classifications.

Vehicle:
  Age;
  manufacturer, model; and
  value.
Driver:
  Age;
  sex;
  marital status;
  driving record (based on government reports), violations (citations);
  at fault accidents; and
  place of residence.
Coverage:
  Types of losses covered,
    liability,
    uninsured motorist,
    comprehensive, and
    collision;
  liability limits; and
  deductibles.

The classifications, such as age, are further broken into actuarial classes, such as 21 to 24, to develop a unique vehicle insurance cost based on the specific combination of actuarial classes for a particular risk. For example, the following information would produce a unique vehicle insurance cost.

Vehicle:
  Age 1993 (three years old)
  manufacturer, model Ford, Explorer XLT
  value $ 18,000.
Driver:
  Age 38 years old
  sex male
  marital status single
  driving record (based on government reports)
    violations 1 point (speeding)
    at fault accidents 3 points (one at fault accident)
    place of residence 33619 (zip code)
Coverage:
Types of losses covered
  liability yes
  uninsured motorist no
  comprehensive yes
  collision yes
liability limits $100,000./$300,000./$50,000.
deductibles $500./$500.

A change to any of this information would result in a different premium being charged, if the change resulted in a different actuarial class for that variable. For instance, a change in the drivers' age from 38 to 39 may not result in a different actuarial class, because 38 and 39 year old people may be in the same actuarial class. However, a change in driver age from 38 to 45 may result in a different premium because of the change in actuarial class.

Current insurance rating systems also provide discounts and surcharges for some types of use of the vehicle, equipment on the vehicle and type of driver. Common surcharges and discounts include:

Surcharges:
  Business use.
Discounts:
  Safety equipment on the vehicle
    airbags, and
    antilock brakes;
  theft control devices
    passive systems (e.g. "The Club"), and
    alarm system; and
  driver type
    good student, and
    safe driver (accident free).

A principal problem with such conventional insurance determination systems is that much of the data gathered from the applicant in the interview is not verifiable, and even existing public records contain only minimal information, much of which has little relevance towards an assessment of the likelihood of a claim subsequently occurring. In other words, current rating systems are primarily based on past realized losses. None of the data obtained through conventional systems necessarily reliably predicts the manner or safety of future operation of the vehicle. Accordingly, the limited amount of accumulated relevant data and its minimal evidential value towards computation of a fair cost of insurance has generated a long-felt need for an improved system for more reliably and accurately accumulating data having a highly relevant evidential value towards predicting the actual manner of a vehicle's future operation.

Many types of vehicle operating data recording systems have heretofore been suggested for purposes of maintaining an accurate record of certain elements of vehicle operation. Some are suggested for identifying the cause for an accident, others are for more accurately assessing the efficiency of operation. Such systems disclose a variety of conventional techniques for recording vehicle operation data elements in a variety of data recording systems. In addition, it has also been suggested to provide a radio communication link for such information via systems such as a cellular telephone to provide immediate communication of certain types of data elements or to allow a more immediate response in cases such as theft, accident, break-down or emergency. It has even been suggested to detect and record seatbelt usage to assist in determination of the vehicle insurance costs (U.S. Pat. No. 4,667,336).

The various forms and types of vehicle operating data acquisition and recordal systems that have heretofore been suggested and employed have met with varying degrees of success for their express limited purposes. All possess substantial defects such that they have only limited economical and practical value for a system intended to provide an enhanced acquisition, recordal and communication system of data which would be both comprehensive and reliable in predicting an accurate and adequate cost of insurance for the vehicle. Since the type of operating information acquired and recorded in prior art systems was generally never intended to be used for determining the cost of vehicle insurance, the data elements that were monitored and recorded therein were not directly related to predetermined safety standards or the determining of an actuarial class for the vehicle operator. For example, recording data characteristics relevant to the vehicle's operating efficiency may be completely unrelated to the safety of operation of the vehicle. Further, there is the problem of recording and subsequently compiling the relevant data for an accurate determination of an actuarial profile and an appropriate insurance cost therefor.

Current motor vehicle control and operating systems comprise electronic systems readily adaptable for modification to obtain the desired types of information relevant to determination of the cost of insurance. Vehicle tracking systems have been suggested which use communication links with satellite navigation systems for providing information describing a vehicle's location based upon navigation signals. When such positioning information is combined with roadmaps in an expert system, vehicle location is ascertainable. Mere vehicle location, though, will not provide data particularly relevant to safety of operation unless the data is combined with other relevant data in an expert system which is capable of assessing whether the roads being driven are high-risk or low-risk with regard to vehicle safety.

The present invention contemplates a new and improved motor vehicle monitoring, recording and communication system, which primarily overcomes the problem of determining cost of vehicle insurance based upon data which does not take into consideration how a specific vehicle is operated. The subject invention will base insurance charges with regard to current material data representative of actual driving characteristics of the vehicle and driver operation to provide a classification rating of the operator and the vehicle in an actuarial class which has a vastly reduced rating error over conventional insurance cost systems. Additionally, the present invention allows for frequent (monthly) adjustment to the cost of coverage because of the changes in operator behavior and driving patterns. This can result in automobile insurance charges that are readily controllable by individual operators. The system is adaptable to current electronic operating systems, tracking systems and communication systems for the improved extraction of selected insurance related data.

BRIEF SUMMARY OF THE INVENTION

In accordance with the present invention, there is disclosed a method of determining a cost of automobile insurance based upon monitoring, recording and communicating data representative of operator and vehicle driving characteristics, whereby the cost is adjustable by relating the driving characteristics to predetermined safety standards. The method is comprised of steps of monitoring a plurality of raw data elements representative of an operating state of a vehicle or an action of the operator. Selected ones of the plurality of raw data elements are recorded when they are determined to have an identified relationship to the safety standards. The recorded elements are consolidated for processing against an insured profile and for identifying, a surcharge or discount to be applied to a base cost of automobile insurance. The total cost of insurance obtained from combining the base cost and surcharges or discounts is produced as a final cost to the operator.

In accordance with another aspect of the present invention, the recording comprises identifying a trigger event associated with the raw data elements which has an identified relationship to the safety standards so that trigger information representative of the event is recorded.

In accordance with a more limited aspect of the present invention, the method comprises a step of immediately communicating to a central control station via an uplink, information representative of the trigger event and recording response information generated by the control station.

In accordance with yet another aspect of the present invention, the method comprises steps of generating calculated data elements and derived data elements from the raw data elements, and accumulating the calculated and derived data elements in a recording device.

The present invention will use information acquired from the vehicle to more accurately assess vehicle usage and thereby derive insurance costs more precisely and fairly. Examples of possible actuarial classes developed from vehicle provided data include:

Driver:

Total driving time in minutes by each driver of the insured vehicle;

number of minutes driving in high/low risk locations (high/low accident areas);

number of minutes of driving at high/low risk times (rush hour or Sunday afternoon);

safe driving behavior,
  using seat belts,
  use of turn signals,
  observance of speed limits, and
  observance of traffic control devices;

number of sudden braking situations; and number of sudden acceleration situations.

Vehicle:

Location vehicle is parked at night (in garage, in driveway, on street); and location vehicle is parked at work (high theft locations, etc.).

These new and more precise actuarial classes are considered to be better predictors of loss because they are based on actual use of the vehicle and the behaviors demonstrated by the driver. This will allow the consumers unprecedented control over the ultimate cost of their vehicle insurance.

In accordance with the present invention, additional discounts and surcharges based on data provided by the insured vehicle will be available. Examples of surcharges and discounts based on vehicle provided data include:

Surcharges:

Excessive hard braking situations occurring in high risk locations; and intermittent use of a safety device, such as seat belts.

Discounts:

Regular selection of low/high risk routes of travel;

regular travel at low/high risk times;

significant changes in driving behavior that results in a lower risk;

vacation discount when the vehicle is not used;

regular use of safety devices; and unfailing observance of speed limits.

There is some overlap between the use of actuarial classes and discounts and surcharges. Until data has been gathered and analyzed it is not possible to determine which vehicle provided data will be used to determine actuarial classes and which will be used for surcharges or discounts.

One benefit obtained by use of the present invention is a system that will provide precise and timely information about the current operation of an insured motor vehicle that will enable an accurate determination of operating characteristics, including such features as miles driven, time of use and speed of the vehicle. This information can be used to establish actual usage based insurance charges, eliminating rating errors that are prevalent in traditional systems and will result in vehicle insurance charges that can be directly controlled by individual operators.

It is another benefit of the subject invention that conventional motor vehicle electronics are easily supplemented by system components comprising a data recording, a navigation system and a communications device to extract selected insurance relevant data from the motor vehicle.

It is yet another object of the present invention to generate actuarial classes and operator profiles relative thereto based upon actual driving characteristics of the vehicle and driver, as represented by the monitored and recorded data elements for providing a more knowledgeable, enhanced insurance rating precision.

The subject new insurance rating system retrospectively adjusts and prospectively sets premiums based on data derived from motor vehicle operational characteristics and driver behavior through the generation of new actuarial classes determined from such characteristics and behavior, which classes heretofore have been unknown in the insurance industry. The invention comprises an integrated system to extract via multiple sensors, screen, aggregate and apply for insurance rating purposes, data generated by the actual operation of the specific vehicle and the insured user/driver.

Other benefits and advantages of the subject new vehicle insurance cost determination process will become apparent to those skilled in the art upon a reading and understanding of the specification.

BRIEF DESCRIPTION OF THE DRAWINGS

The invention may take physical form in certain parts and steps and arrangements of parts and steps, the preferred embodiments of which will be described in detail in this specification and illustrated in the accompanying drawings which form a part hereof and wherein:

FIG. 5 is a flowchart generally illustrating a method for acquiring and recording vehicle insurance related data; and FIG. 6 is a tabular illustration of various sources of insurance-related data, a necessary interface for acquiring the data and an exemplary sample rate therefor.

DETAILED DESCRIPTION OF THE INVENTION

Figure 1:
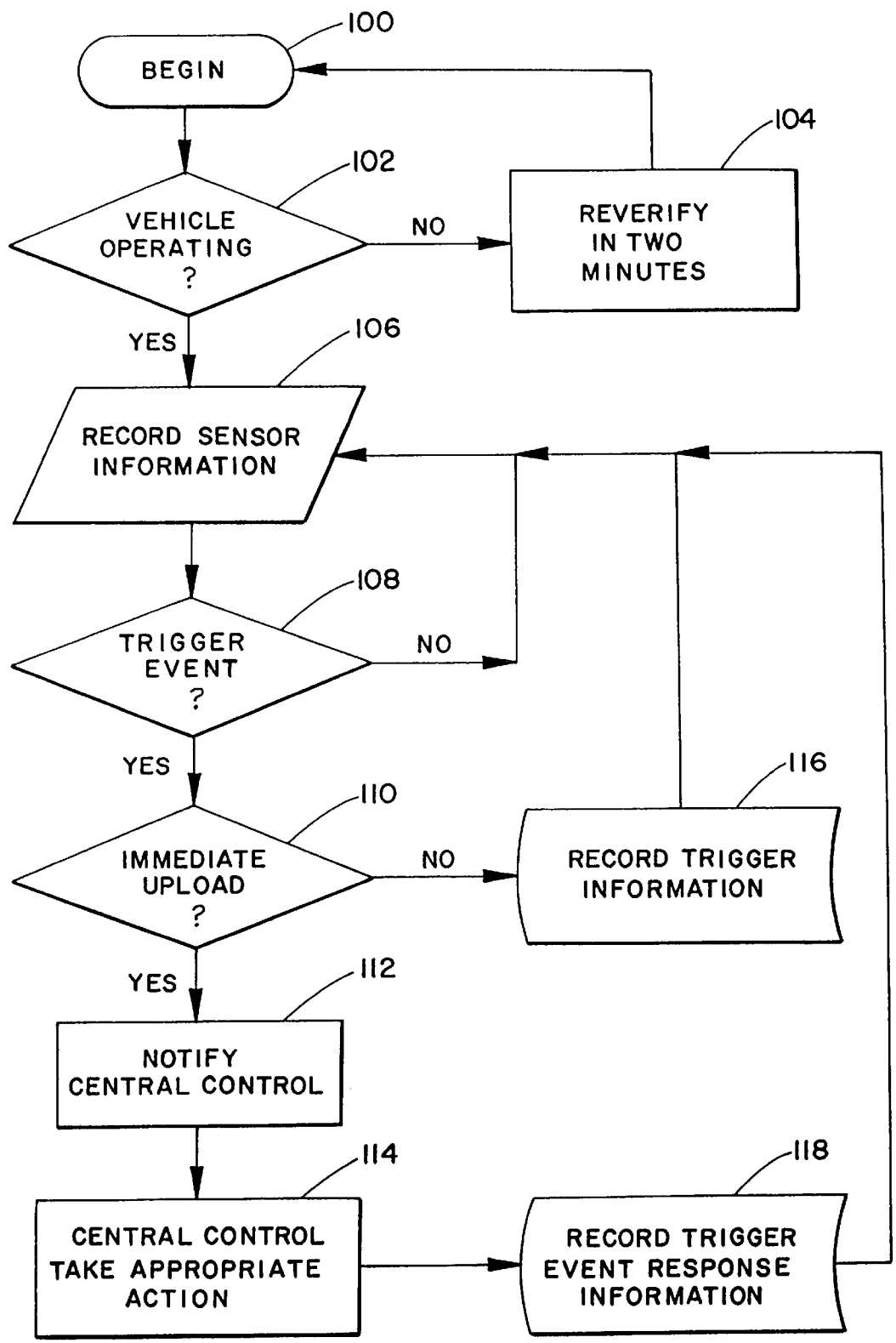
FIG. 1 is a flowchart generally describing a data gathering process from a vehicle.

Referring now to the drawings, wherein the showings are for purposes of illustrating the preferred embodiments of the invention only and not for purposes of limiting same, the FIGURES show an apparatus and method for monitoring, recording and communicating insurance related data for determination of an accurate cost of insurance based upon evidence relevant to the actual operation and in particular the relative safety of that operation. Although described with specific reference to automobiles, this invention is also applicable to other operator controlled motor vehicles normally requiring insurance. Generally, a vehicle user is charged for insurance based upon statistical averages related to the safety of operation based upon the insurer's experience with other users who drive similar vehicles in a similar geographic area. The invention allows for the measure of the actual data while the motor vehicle is being driven. Such data measurement will allow the vehicle user to directly control his/her insurance costs by operating the vehicle in a manner which he/she will know will evidence superior safety of operation and a minimal risk of generation of an insurance claim. Examples of data which can be monitored and recorded include:

1. Actual miles driven;
2. Types of roads driven on (high risk vs. low risk); and,
3. Safe operation of the vehicle by the vehicle user through:
   A. speeds driven,
   B. safety equipment used, such as seat belt and turn signals,
   C. time of day driven (high congestion vs. low congestion),
   D. rate of acceleration,
   E. rate of braking,
   F. observation of traffic signs.

Figure 3:
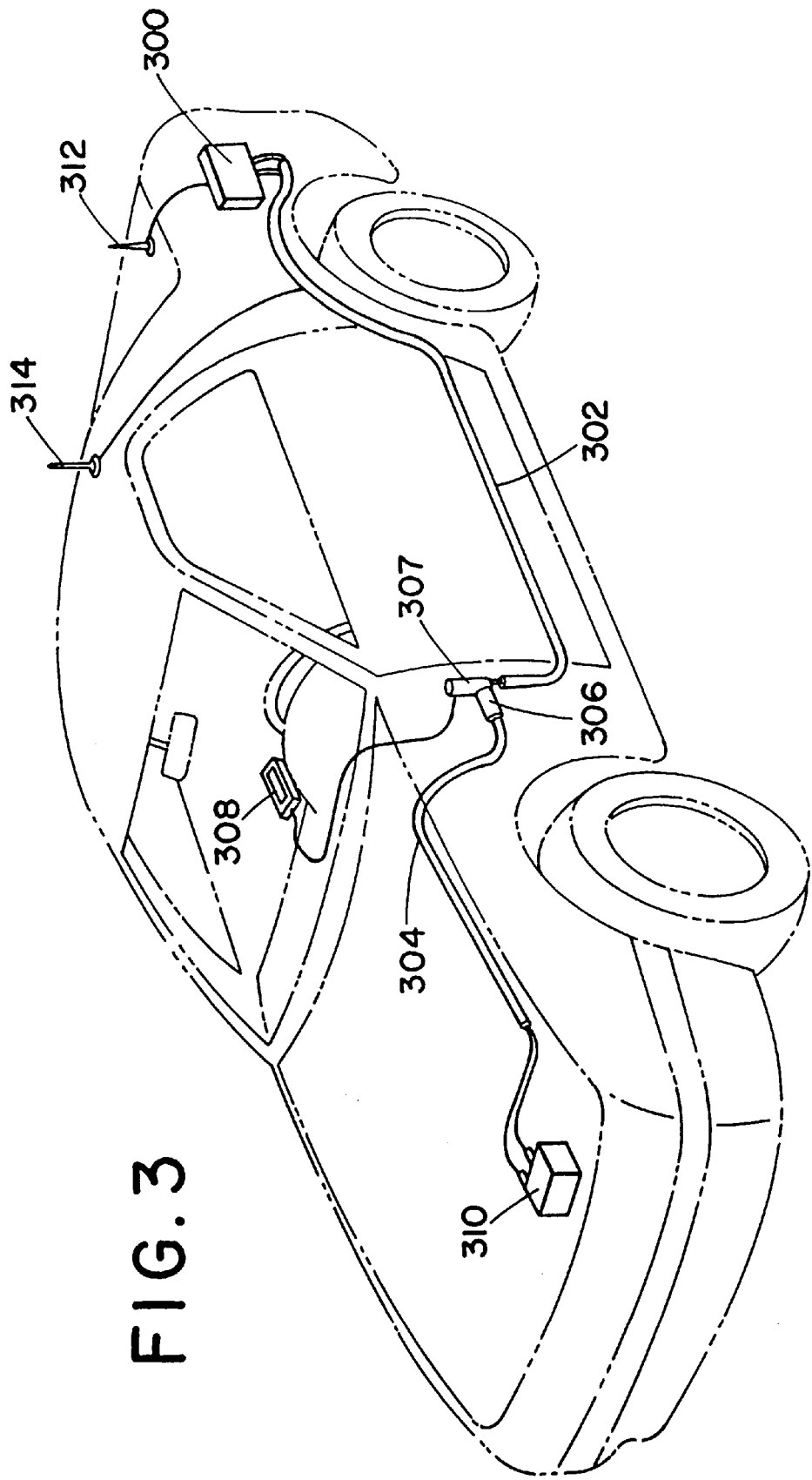
FIG. 3 is a suggestive perspective drawing of a vehicle including certain data element monitoring, recording and communicating devices.

With reference to FIG. 3, an exemplary motor vehicle is shown in which the necessary apparatus for implementing the subject invention is included. An on-board computer 300 monitors and records various sensors and operator actions to acquire the desired data for determining a fair cost of insurance. Although not shown therein, a plurality of operating sensors are associated with the motor vehicle to monitor a wide variety of raw data elements. Such data elements are communicated to the computer through a connections cable which is operatively connected to the vehicle data bus 304 through an SAE-J1978 connector, or OBD-II connector or other vehicle sensors 306. A driver input device 308 is also operatively connected to the computer 300 through connector 307 and cable 302. The computer is powered through the car battery 310 or a conventional generator system (not shown). Tracking of the vehicle for location identification can be implemented by the computer 300 through navigation signals obtained from a GPS (global positioning system) antenna or other locating system 312. The communications link to a central control station is accomplished through the cellular telephone, radio, satellite or other wireless communication system 314.

Figure 4:
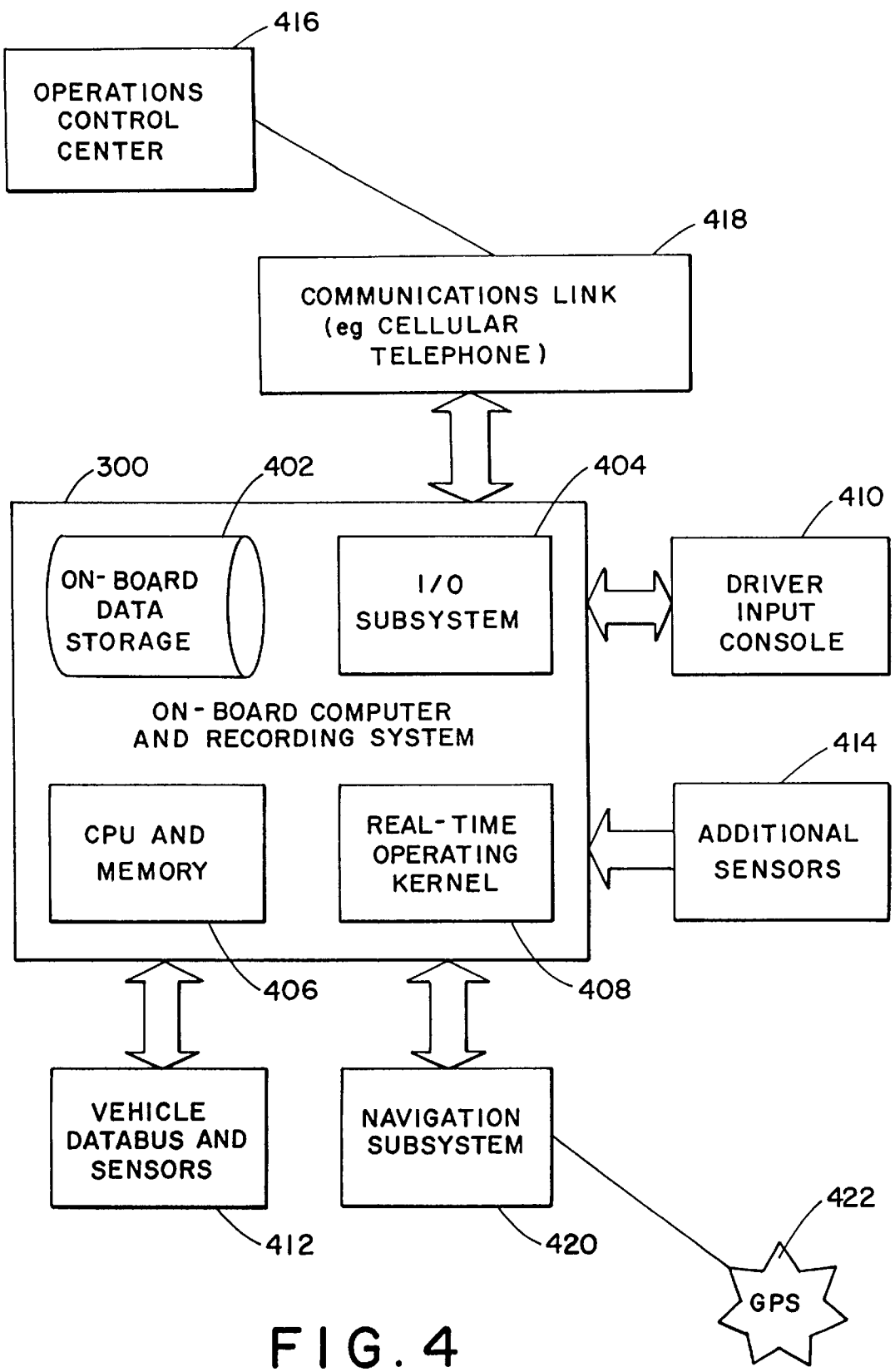
FIG. 4 is a block diagram of a vehicle on-board computer and recording system implementing the subject invention for selective communication with a central control center and a global positioning navigation system.

FIG. 4 provides the block diagram of the in-vehicle computer system. The computer 300 is comprised of four principal components, an on-board data storage device 402, an input/output subsystem 404 for communicating to a variety of external devices, a central processing unit and memory device 406 and a real time operating kernel 408 for controlling the various processing steps of the computer 300. The computer 300 essentially communicates with three on-board vehicle devices for acquisition of information representative of various actual vehicle operating characteristics. A driver input console 410 allows the driver to input data representative of a need for assistance or for satisfaction of various threshold factors which need to be satisfied before the vehicle can be operated. The physical operation of the vehicle is monitored through various sensors 412 in operative connection with the vehicle data bus, while additional sensors 414 not normally connected to the data bus can be in direct communication with the computer 300 as will hereinafter be more fully explained.

The vehicle is linked to an operation control center 416 by a communications link 418, preferably comprising a conventional cellular telephone interconnection. A navigation sub-system 420 receives radio navigation signals from a GPS 422.

The type of elements monitored and recorded by the subject invention comprise raw data elements, calculated data elements and derived data elements. These can be broken down as follows:

Raw Data Elements:
  Power train sensors
    RPM,
    transmission setting (Park, Drive, Gear, Neutral),
    throttle position,
    engine coolant temperature,
    intake air temperature,
    barometric pressure;
  Electrical sensors
    brake light on,
    turn signal indicator,
    headlamps on,
    hazard lights on,
    back-up lights on,
    parking lights on,
    wipers on,
    doors locked,
    key in ignition,
    key in door lock,
    horn applied;
  Body sensors
    airbag deployment,
    ABS application,
    level of fuel in tank,
    brakes applied,
    radio station tuned in,
    seat belt on,
    door open,
    tail gate open,
    odometer reading,
    cruise control engaged,
    anti-theft disable;
  Other sensors
    vehicle speed,
    vehicle location,
    date,
    time,
    vehicle direction,
    IVHS data sources.
Calculated Data Elements:
  rapid deceleration;
  rapid acceleration;
  vehicle in skid;
  wheels in spin;
  closing speed on vehicle in front;
  closing speed of vehicle in rear;
  closing speed of vehicle to side (right or left);
  space to side of vehicle occupied;
  space to rear of vehicle occupied;
  space to front of vehicle occupied;
  lateral acceleration;
  sudden rotation of vehicle;
  sudden loss of tire pressure;
  driver identification (through voice recognition or code or fingerprint recognition);
  distance travelled; and
  environmental hazard conditions (e.g. icing, etc.).
Derived Data Elements:
  vehicle speed in excess of speed limit;
  observation of traffic signals and signs;
  road conditions;
  traffic conditions; and
  vehicle position.

This list includes many, but not all, potential data elements.

With particular reference to FIG. 1, a flowchart generally illustrating the data gathering process of the subject invention is illustrated. Such a process can be implemented with conventional computer programming in the real time operating kernel 408 of the computer 300. The process is identified with initially a begin step 100 (key in ignition?) and a check of whether the vehicle is operating at step 102. If the vehicle is not operating a reverification occurs every two (2) minutes as shown at step 104. It should be noted that the computer is continually powered by at least the vehicle battery 310 (FIG. 3), but it can be appreciated that during operation the generator (not shown) will supply the energy. If the vehicle is operating, then there is a step of recording sensor information 106. The recording comprises monitoring a plurality of raw data elements, calculated data elements and derived data elements as identified above. Each of these is representative of an operating state of the vehicle or an action of the operator. Select ones of the plurality of data elements are recorded when the ones are determined to have an identified relationship to the safety standards. For example, vehicle speed in excess of a predetermined speed limit will need to be recorded but speeds below the limit need only be monitored and stored on a periodic basis. The recording may be made in combination with date, time and location. Other examples of data needed to be recorded are excessive rates of acceleration or frequent hard braking.

The recording process would be practically implemented by monitoring and storing the data in a buffer for a selected period of time, e.g., thirty seconds. Periodically, such as every two minutes, the status of all monitored sensors for the data elements is written to a file which is stored in the vehicle data storage 402. The raw, calculated and derived data elements listed above comprise some of the data elements to be so stored.

Certain of the recorded sensor information may comprise a trigger event of which inquiry is identified at step 108. "Trigger events" are defined as a combination of sensor data requiring additional action or which may result in a surcharge or discount during the insurance billing process. Certain trigger events may require immediate upload 110 to a central control 112 which will then be required to take appropriate action 114. For example, a trigger event would be rapid deceleration in combination with airbag deployment indicating a collision, in which case the system could notify the central control of the vehicle location. Alternatively, if the operator were to trigger on an emergency light, similarly the system could notify the central control of the vehicle location indicating that an emergency is occurring. Alternatively, if the trigger information is not so serious as to require immediate upload (i.e., the inquiry is "NO") then, the trigger information is recorded, as at step 116. For upload information, whatever response is taken by the central control is also recorded at step 118. The trigger information recording step 116 and the recording sensor information step 106 may impart recording of information in the on-board data storage device 402 or memory 406. The event response information recording at step 118 will usually occur in the central control station. Such response information could be the dispatch of an emergency vehicle, or the telephoning of police or an EMS unit. The "NO" response to the trigger event inquiry 108 indicates that the system remains in a wait loop with the recording sensor information step 106.

Trigger events are divided into two groups: those requiring immediate action and those not requiring immediate action, but necessary for proper billing of insurance. Those required for proper billing of insurance will be recorded in the same file with all the other recorded vehicle sensor information. Those trigger events requiring action will be uploaded 110, 112 to a central control center which can take action 114 depending on the trigger event. Some trigger events will require dispatch of emergency services, such as police or EMS, and others will require the dispatch of claims representatives from the insurance company.

The following comprises an exemplary of some, but not all, trigger events:

Need for Assistance:

These events would require immediate notification of the central control center.

1. Accident Occurrence. An accident could be determined through the use of a single sensor, such as the deployment of an airbag. It could also be determined through the combination of sensors, such as a sudden deceleration of the vehicle without the application of the brakes.
2. Roadside assistance needed. This could be through the pressing of a "panic button" in the vehicle or through the reading of a sensor, such as the level of fuel in the tank. Another example would be loss of tire pressure, signifying a flat tire.
3. Lock-out assistance needed. The reading of a combination of sensors would indicate that the doors are locked but the keys are in the ignition and the driver has exited the vehicle.
4. Driving restrictions. The insured can identify circumstances in which he/she wants to be notified of driving within restricted areas, and warned when he/she is entering a dangerous area. This could be applied to youthful drivers where the parent wants to restrict time or place of driving, and have a record thereof.

Unsafe Operation of the Vehicle

These events would be recorded in the in-vehicle recording device for future upload. Constant trigger events would result in notification of the driver of the exceptions.

1. Excessive speed. The reading of the vehicle speed sensors would indicate the vehicle is exceeding the speed limit. Time would also be measured to determine if the behavior is prolonged.
2. Presence of alcohol. Using an air content analyzer or breath analyzer, the level of alcohol and its use by the driver could be determined.
3. Non-use of seatbelt. Percent of sample of this sensor could result in additional discount for high use or surcharge for low or no use.
4. Non-use of turn signals. Low use could result in surcharge.
5. ABS application without an accident. High use could indicate unsafe driving and be subject to a surcharge.

Figure 2:
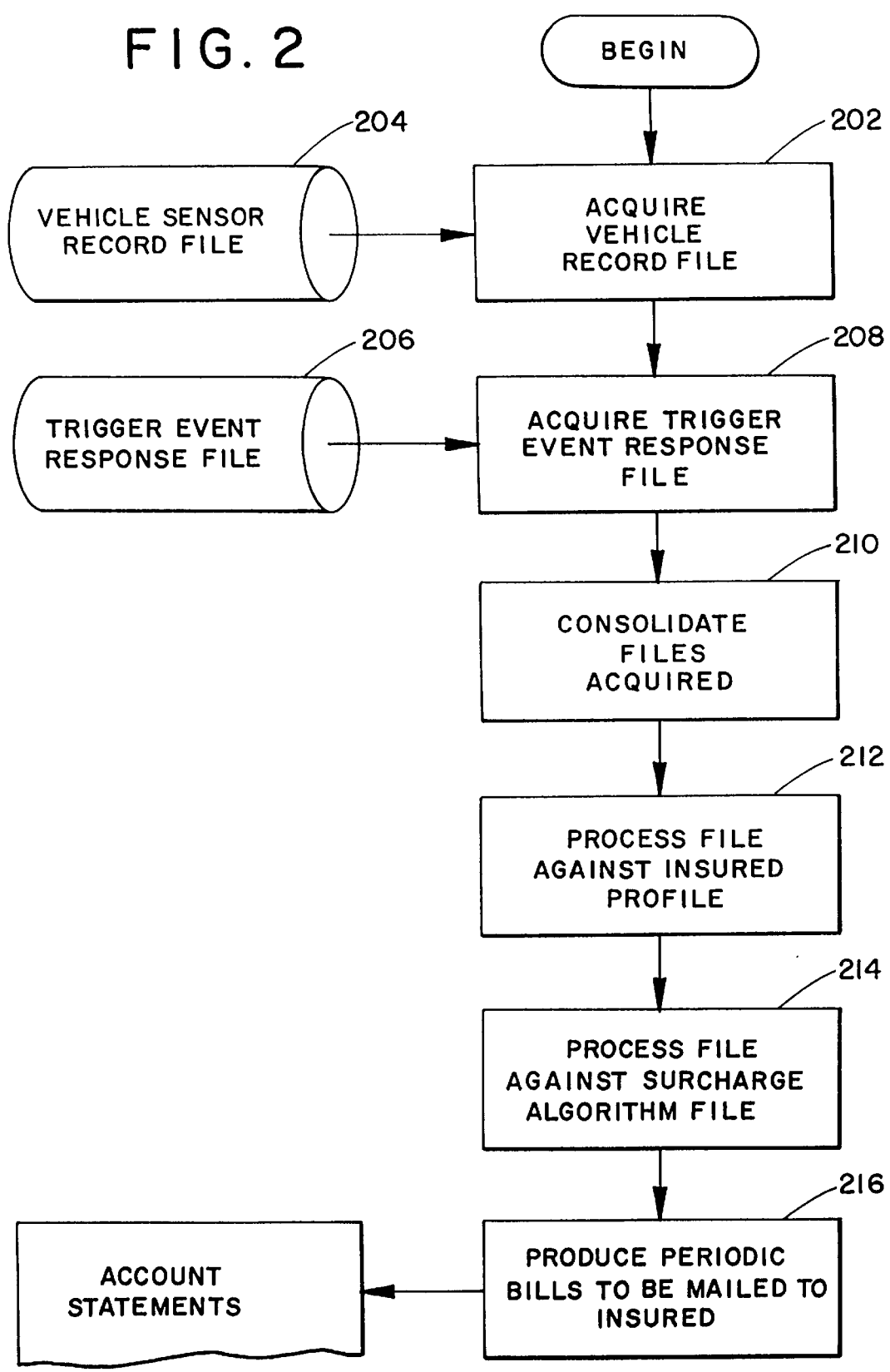
FIG. 2 is a flowchart detailing the gathering and consolidating of appropriate information for determining a cost of insurance and the resulting insurance billing process.

With particular reference to FIG. 2, a general flowchart describing the steps of the gathering of appropriate information for billing insurance on a periodic basis is illustrated.

At the initiation of the vehicle insurance billing process, the central billing system of the insurer will acquire 202 the vehicle sensor record file from the sensor record file 204 from each vehicle to be billed. This process of data acquisition will involve a periodic uploading of the vehicle file 204. This file will be uploaded to the central system when the storage device 402 in the vehicle approaches capacity, on command, or when the billing process starts. All the information from the combination of files stored in the vehicle will be used to determine the bill for the insurance on the vehicle for the prior insurance period. Data acquisition is also made from the trigger event response file 206 in the acquisition step 208. This data is stored in the central control center, and includes information for response activities listed above which require additional billing for services rendered to the insured.

At step 210, the vehicle sensor record file and the trigger event response file are consolidated. Such files will include all the activity for which the insured is to be billed for the prior period. At step 212, all the information comprising the insured profile, which is already maintained and stored in other insurance files, is applied to the consolidated activity files for the immediately prior period. This insured profile includes the information about coverages including limits and deductibles, which are necessary for establishing the appropriate cost of insurance for the subject insured. At step 214, the acquired consolidated file information from step 210 and the overall insured profile acquired at step 212 are combined and processed against a surcharge or discount algorithm file, which include the specific factors for the various usage patterns and trigger events. The surcharges and discounts are continuously adjusted based on the loss results associated with driving behaviors demonstrated. Finally at step 216, the appropriate billing is produced showing the charges for insurance and other services for the prior period. The billing can be sent electronically or in printed form to the insured for payment.

With particular reference to FIG. 5, a general diagram of the process for acquiring and recording vehicle insurance related data is illustrated. At step 502, the raw data elements are collected from the vehicle sensors that provide the raw data elements identified above. Calculated data elements are generated in step 504 and derived data elements are generated at step 508. As noted, it is necessary to collect certain database information elements at step 506 prior to generating the derived data elements. A sample of all the data elements is stored in the vehicle at step 510. The sample rate or the recording of the information is controlled based upon the particular insurance billing recording needs predetermined by an algorithm developed by the insurance company. The algorithm will change depending on the particular type of insurance related requirements for the information. At step 512, if a certain incident, for example collision, occurs then a snapshot is generated of all the relevant data elements at the time of the incident, 514. If no such incident occurs (i.e., the condition inquiry is "NO"), the system remains in the data collection loop.

With reference to FIG. 6, various examples of sources of insurance related data, the interface required to acquire the data and an example of the sample rate are illustrated for a preferred embodiment of the subject invention. Accordingly, it can be seen that for a certain information database comprised of maps, speed limits, traffic signs, and highway conditions is stored in the data storage device of the computer and can be obtained on demand therefrom. Acquiring data from vehicle sources such as engine data, body data and electrical data is obtained through a conventional SAEJ 1978 connector with an exemplary sample rate of 10–15 Hz. The other sources of relevant data, such as IVHs, GPS, security system or any additional systems are obtained through various I/O ports and the sample rate can be varied in accordance with the desired goals of the insurer.

One of the useful consequences of the subject invention is that other products could be marketed to a particular vehicle operator based on information provided from the subject invention from the operator's motor vehicle. Since the invention includes processes for gathering, extracting and analyzing information provided by the vehicle, a more informed judgment can be made about a determination of when and which products could be marketed to that motor vehicle operator. For example, by knowing that a vehicle operator travels on vacation in that vehicle to a certain resort location may give rise to a marketing of a package of products particular to the type of travel or the location. Another example would relate to the knowledge that the vehicle operator attends particular types of sporting events which may give rise to certain types of products catered to fans of that sporting event.

The invention has been described with reference to preferred embodiments. Obviously, modifications and alterations will occur to others upon a reading and understanding of the specification. It is our intention to include all such modifications and alterations insofar as they come within the scope of the appended claims or the equivalents thereof.

What is claimed is:

1. A method of generating a database comprising data elements representative of operator or vehicle driving characteristics, the method comprising:

monitoring a plurality of the data elements representative of an operating state of a vehicle or an action of the operator during a selected time period; and, recording selected ones of the plurality of data elements into the database when said ones are determined to be appropriate for recording relative to determining a cost of insurance for the vehicle during the selected time period, said ones including, a time and location of vehicle operation and a corresponding log of vehicle speed for the time and location.

2. A database comprising data elements representative of operator or vehicle driving characteristics for a selected time period including a time and location of vehicle operation and a corresponding log of vehicle speed for the time and location, the database then being used to determine an insurance charge for the vehicle operation for said selected time period.

3. The database as defined in claim 2 wherein the data elements comprise raw data elements, derived data elements and calculated data elements.

4. A method of insuring a vehicle operator for a selected period based upon operator driving characteristics during the period, comprising, steps of:

generating an initial operator profile;

monitoring operator driving characteristics during the selected period; and deciding a cost of vehicle insurance for the period based upon the operating characteristics monitored in that period.

5. A method of determining a cost of vehicle insurance for a selected period based upon monitoring, recording and communicating data representative of operator and vehicle driving characteristics during said period, whereby the cost is adjustable by relating the driving characteristics to predetermined safety standards, the method comprising:

determining an initial insured profile and a base cost of vehicle insurance based on said insured profile;

monitoring a plurality of data elements representative of an operating state of a vehicle or an action of the operator during the selected period;

recording selected ones of the plurality of data elements when said ones are determined to have a preselected relationship to the safety standards;

consolidating said selected ones for identifying a surcharge or discount to be applied to the base cost; and, producing a final cost of vehicle insurance for the selected period from the base cost and the surcharge or discount.

6. A method of monitoring a human controlled power source driven vehicle, the method comprising:

extracting one or more data elements from at least one sensor wherein the one or more elements are of at least one operating state of the vehicle and the at least one human's actions during a data collection period;

analyzing, grouping, and storing the one or more data elements as group data values in a first memory related to a predetermined group of elements; and, correlating the group data values to preset values in a second memory and generating an output data value based on the correlation wherein the output data value is used to compute an insurance rating for the vehicle FOR the data collection period.

7. The method according to claim 6, further including the steps of:

determining if the one or more data elements indicate one or more predetermined triggering events, where if the determination is positive, correlating the one or more data elements to one or more types of triggering events stored in a third memory; and, storing and transmitting a signal corresponding to the determined triggering event to a receiving system.

8. The method according to claim 6, further including the steps of:

determining if the one or more data elements indicate one or more predetermined triggering events, where if the determination is positive, correlating the one or more data elements to one or more types of triggering events stored in a third memory; and, storing or transmitting a signal corresponding to the determined triggering event to a receiving system.

9. The method as defined in claim 6 wherein the output data value is additionally used for computing an insurance rating for the vehicle for a future data collection period.

10. The method according to claim 6, further comprising the steps of:

using safety or other actuarial standard values as the preset values; and, generating an adjusted insurance cost as the output data value.

11. The method according to claim 10, further comprising the steps of:

using location and time as the one or more data elements which are compared to the safety or other actuarial standard values to generate the adjusted insurance cost.

12. The method according to claim 11 wherein:

the adjusted insurance cost can be for a prospective or retrospective basis.

13. The method according to claim 6, further comprising the steps of:

using safety or other actuarial standard values as the preset values; and, generating an adjusted underwriting cost as the output data value.

14. The method according to claim 13, further comprising the steps of:

using location and time as the one or more data elements which are compared to the safety or other actuarial standard values to generate the adjusted underwriting cost.

15. The method according to claim 14 wherein:

the adjusted underwriting cost can be for a prospective or retrospective basis.

* * * * *

(12) EX PARTE REEXAMINATION CERTIFICATE (8789th)
United States Patent
McMillan et al.

(10) Number: US 6,064,970 C1
(45) Certificate Issued: *Jan. 10, 2012

(54) MOTOR VEHICLE MONITORING SYSTEM FOR DETERMINING A COST OF INSURANCE

(75) Inventors: Robert John McMillan, Tampa, FL (US); Alexander Dean Craig, Moreland Hills, OH (US); John Patrick Heinen, Tampa, FL (US)

(73) Assignee: Progressive Casualty Insurance Company, Mayfield Village, OH (US)

Reexamination Request:
No. 90/011,252, Sep. 22, 2010

Reexamination Certificate for:
Patent No.: 6,064,970
Issued: May 16, 2000
Appl. No.: 09/135,034
Filed: Aug. 17, 1998

(*) Notice: This patent is subject to a terminal disclaimer.

Related U.S. Application Data

(63) Continuation of application No. 08/592,958, filed on Jan. 29, 1996, now Pat. No. 5,797,134.

(51) Int. Cl.
*G06Q 40/00* (2006.01)

(52) U.S. Cl. .............. 705/4; 340/439; 340/870.01; 360/5; 702/1; 705/400

(58) Field of Classification Search ................ None
See application file for complete search history.

(56) References Cited

To view the complete listing of prior art documents cited during the proceeding for Reexamination Control Number 90/011,252, please refer to the USPTO's public Patent Application Information Retrieval (PAIR) system under the Display References tab.

*Primary Examiner* — Karin Reichle

(57) ABSTRACT

A method and system of determining a cost of automobile insurance based upon monitoring, recording and communicating data representative of operator and vehicle driving characteristics. The cost is adjustable retrospectively and can be prospectively set by relating the driving characteristics to predetermined safety standards. The method comprises steps of monitoring a plurality of raw data elements representative of an operating state of the vehicle or an action of the operator. Selected ones of the raw data elements are recorded when the ones are determined to have an identified relationship to safety standards. The selected ones are consolidated for processing against an insurer profile and for identifying a surcharge or discount to be applied to a base cost of automobile insurance. A final cost is produced from the base costs and the surcharges or discounts.

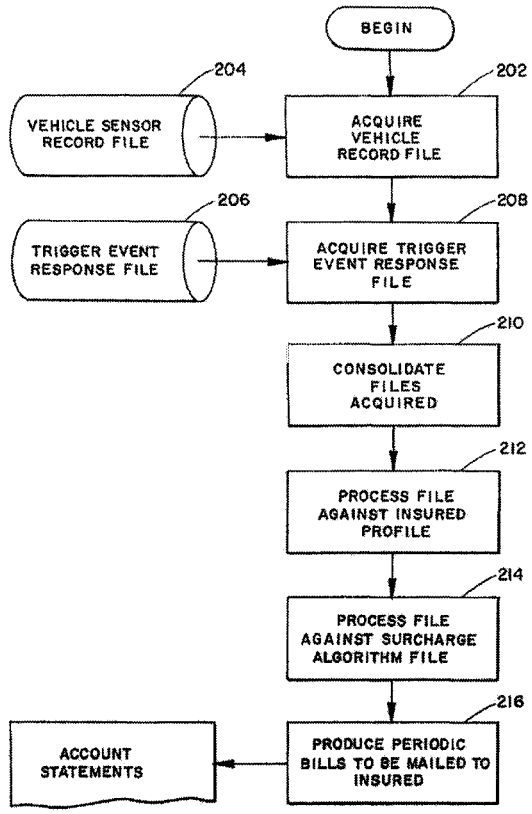

US 6,064,970 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1, and 3-6 are determined to be patentable as amended.

Claims 7-15, dependent on an amended claim, are determined to be patentable.

New claims 16-18 are added and determined to be patentable.

1. A method of generating a database comprising data elements representative of operator or vehicle driving characteristics, the method comprising:
   *generating acturial classes of insurance, which group operators or vehicles having a similar risk characteristic, from actual monitored driving characteristics during a selected time period as represented by recorded data elements representative of an operating state of the vehicles or an action of the operators; and*
   monitoring a plurality of the data elements representative of an operating state of a vehicle or an action of [the] *an* operator during a *latter* selected time period; and,
   recording selected ones of the plurality of data elements into the database when said ones are determined to be appropriate for recording relative to determining a cost of insurance for the vehicle during the *latter* selected time period, said ones including, a time and location of vehicle operation and a corresponding log of vehicle speed for the time and location.

3. The [database] *method* as defined in claim [2] *1* wherein the data elements comprise raw data elements, derived data elements and calculated data elements.

4. A method of insuring a vehicle operator for a selected period based upon operator driving characteristics during the period, comprising, steps of:
   generating an initial operator profile;
   *generating an insured profile for the vehicle operator prior to any monitoring of any of the vehicle operator's driving characteristics wherein the insured profile comprises coverage information, including limits and deductibles, for determining a base cost of vehicle insurance for the vehicle operator;*
   monitoring [operator] *the vehicle operator's* driving characteristics during the selected period; and deciding a *total* cost of vehicle insurance for the *selected* period based upon the [operating] *vehicle operator's driving* characteristics monitored in that *selected* period *and the base cost of insurance*.

5. A method of determining a cost of vehicle insurance for a selected period based upon monitoring, recording and communicating data representative of operator and vehicle driving characteristics during said period, whereby the cost is adjustable by relating the driving characteristics to predetermined safety standards *that are related to a safe operation of a vehicle*, the method comprising:
   determining an initial insured profile *for the operator of the vehicle prior to any monitoring of any data elements representative of an operating state of the vehicle or an action of the operator of the vehicle and determining* a base cost of *the* vehicle insurance based on said *initial* insured profile *wherein the initial insured profile comprises coverage information, including limits and deductibles*;
   monitoring a plurality of *the* data elements representative of [an] *the* operating state of [a] *the* vehicle or [an] *the* action of the operator *of the vehicle* during the selected period;
   recording selected ones of the plurality of data elements when said ones are determined to have a preselected relationship to the safety standards;
   consolidating said selected ones for identifying a surcharge or discount to be applied to the base cost; and,
   producing a final cost of vehicle insurance for the selected period from the base cost and the surcharge or discount.

6. A method of monitoring a human *operator* controlled power source driven vehicle, the method comprising:
   extracting one or more data elements *by a computer programmed to monitor sensor data* from at least one sensor wherein the one or more elements are *actual driving characteristics* of at least one operating state of the and [the] at least one [human's] *human operator's* actions during a data collection period;
   analyzing, grouping, and storing the one or more data elements as group data values in a first memory related to a predetermined group of elements; and,
   correlating the group data values to preset values in a second memory and generating an output data value based on the correlation wherein the output data value is used to compute an insurance rating for the vehicle [FOR the data collection period] *for the data collection period that is based on an actuarial class of insurance which groups other human operator controlled power source driven vehicles having a similar operator or vehicle risk characteristic and which also represents the actual driving characteristics of the vehicle monitored and recorded from the at least one sensor*.

16. *The method of claim 5, wherein the surcharge or discount comprises a discount, and wherein producing the final cost of vehicle insurance comprises applying the discount to the base cost of vehicle insurance.*

17. *The method of claim 5, wherein the surcharge or discount comprises a surcharge, and wherein producing the final cost of vehicle insurance comprises applying the surcharge to the base cost of vehicle insurance.*

18. *A method of monitoring a human operator controlled power source driven vehicle, the method comprising:*
   *extracting one or more data elements by an on-board computer from at least one sensor wherein the one or more elements are actual driving characteristics of at least one operating state of the vehicle and at least one human operator's actions during a data collection period;*
   *analyzing, grouping, and storing the one or more data elements as group data values in a first memory related to a predetermined group of elements;*

*correlating the group data values to preset values related to safety standards in a second memory and generating an output data value based on the correlation; and computing an insurance rating based upon the output data value for the vehicle for the data collection period, in which the insurance rating is also based on an actuarial class of insurance wherein said actuarial class of insurance groups other human operator controlled power source driven vehicles having a similar operator or vehicle risk characteristic as well as represents the actual driving characteristics of the vehicle monitored and recorded from the at least one sensor, and setting prospective insurance premiums based on the actuarial class of insurance.*

\* \* \* \* \*